July 25, 1933.  J. W. BACE  1,919,875
PROPELLER PITCH REGULATOR
Filed April 13, 1932  6 Sheets-Sheet 1
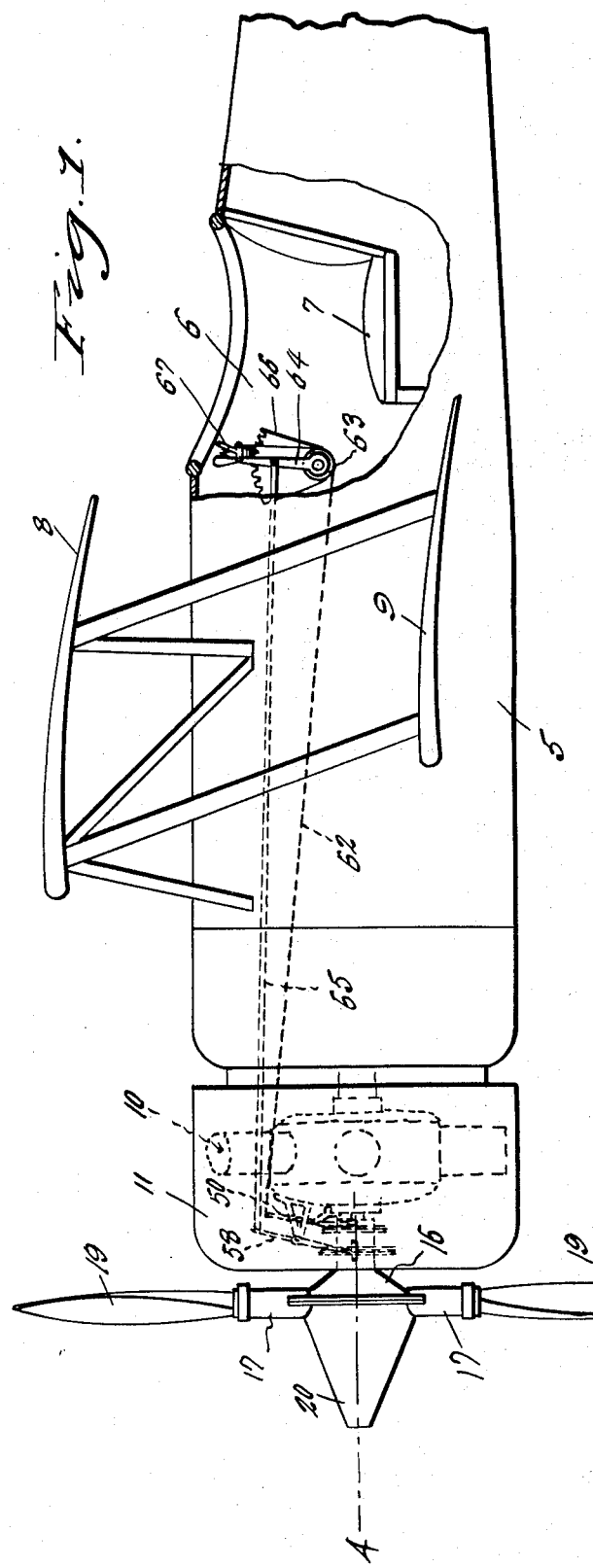
Inventor
J. W. Bace
By Clarence A. O'Brien
Attorney July 25, 1933.  J. W. BACE  1,919,875
PROPELLER PITCH REGULATOR
Filed April 13, 1932   6 Sheets-Sheet 2
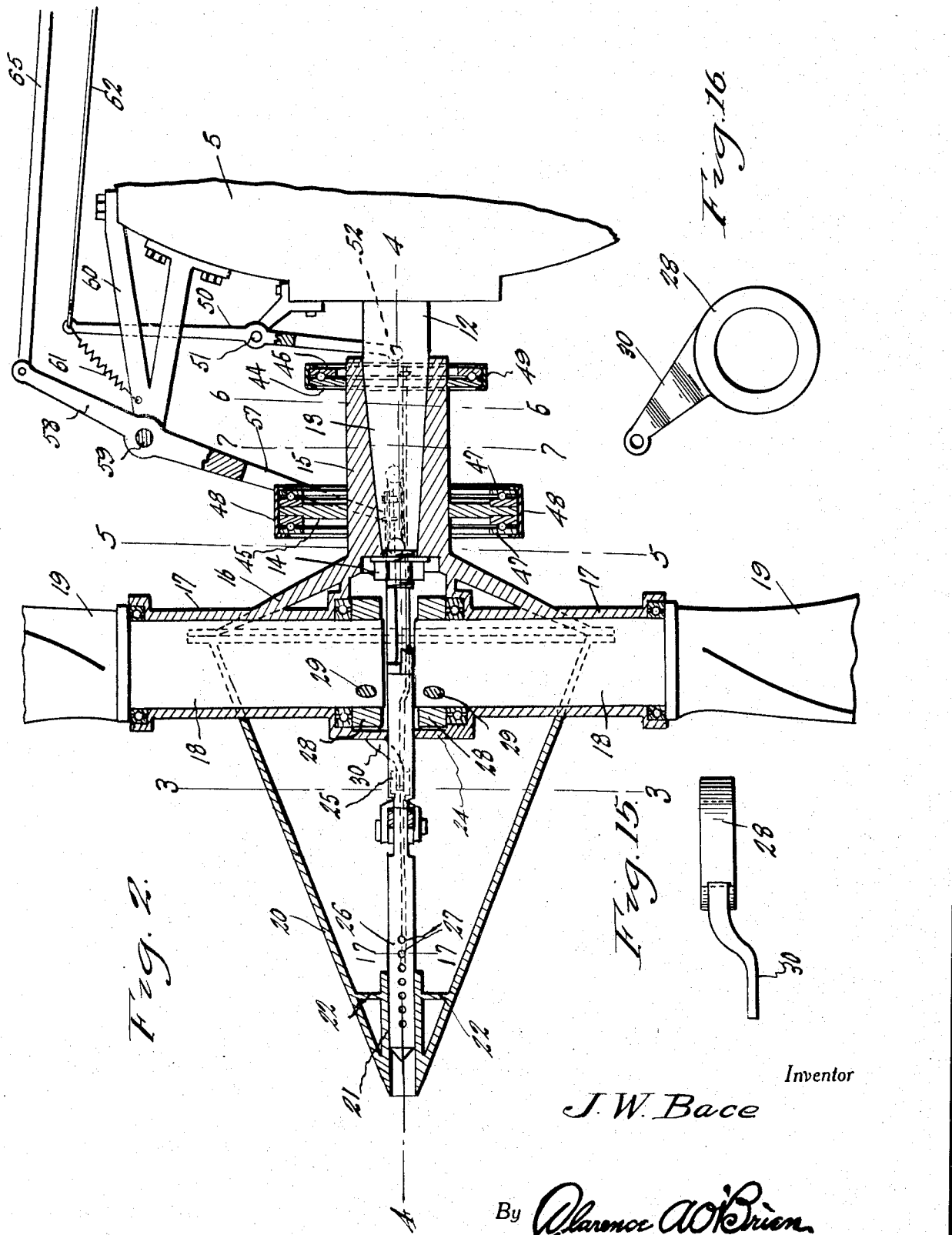
Inventor
J. W. Bace
By Clarence A. O'Brien
Attorney

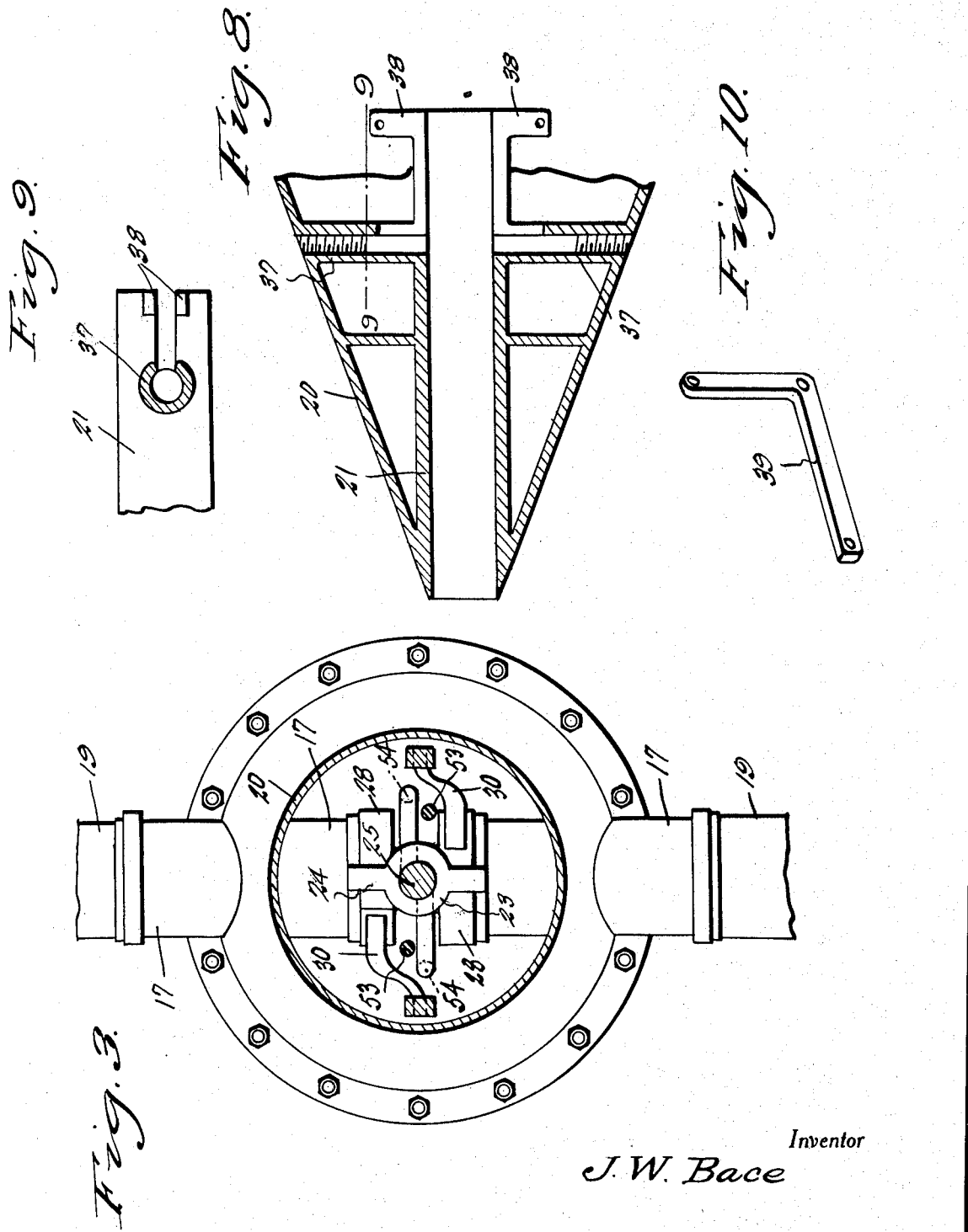

July 25, 1933. J. W. BACE 1,919,875
PROPELLER PITCH REGULATOR
Filed April 13, 1932  6 Sheets-Sheet 4
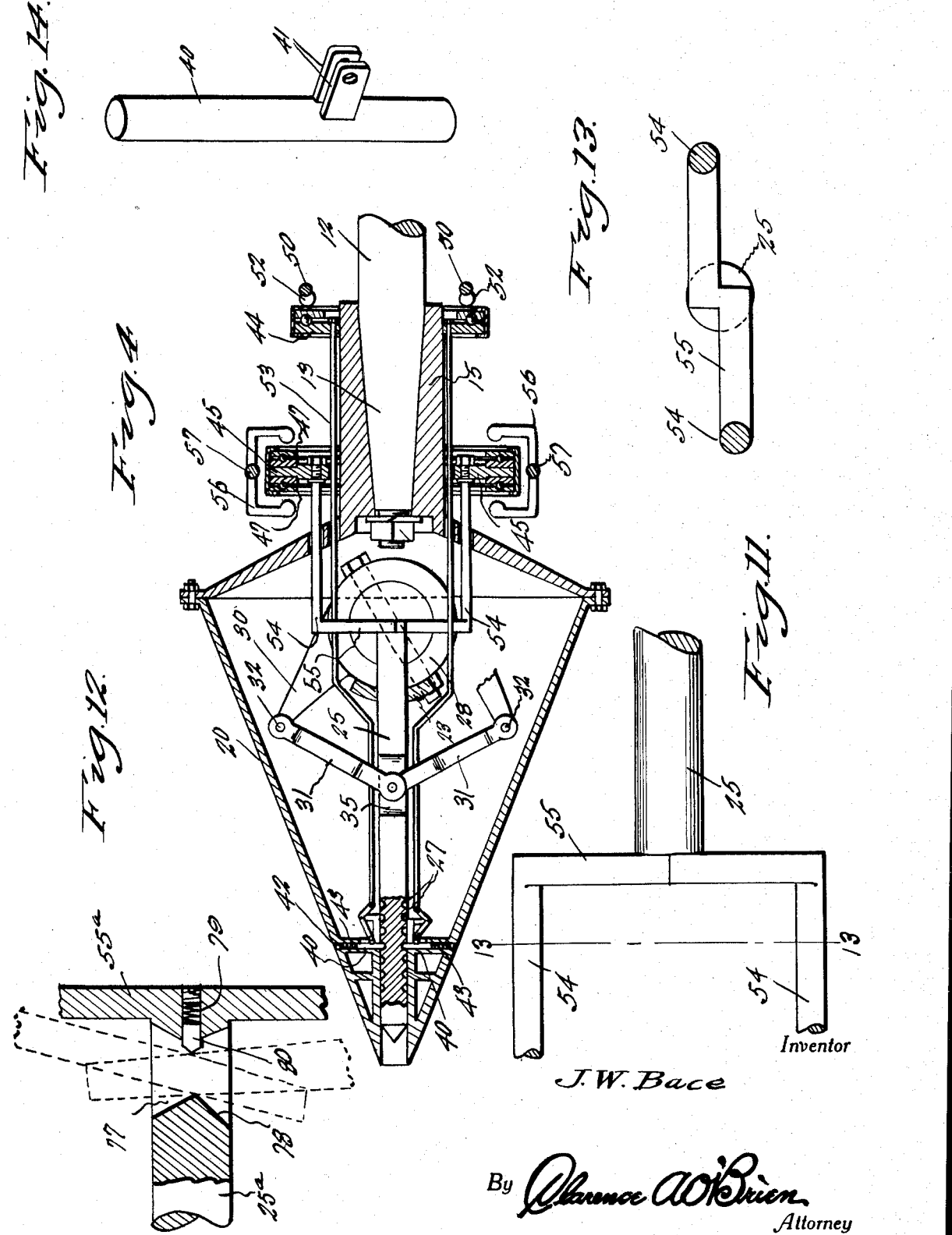
Inventor
J. W. Bace
By Clarence A. O'Brien
Attorney July 25, 1933.  J. W. BACE  1,919,875
PROPELLER PITCH REGULATOR
Filed April 13, 1932   6 Sheets-Sheet 5
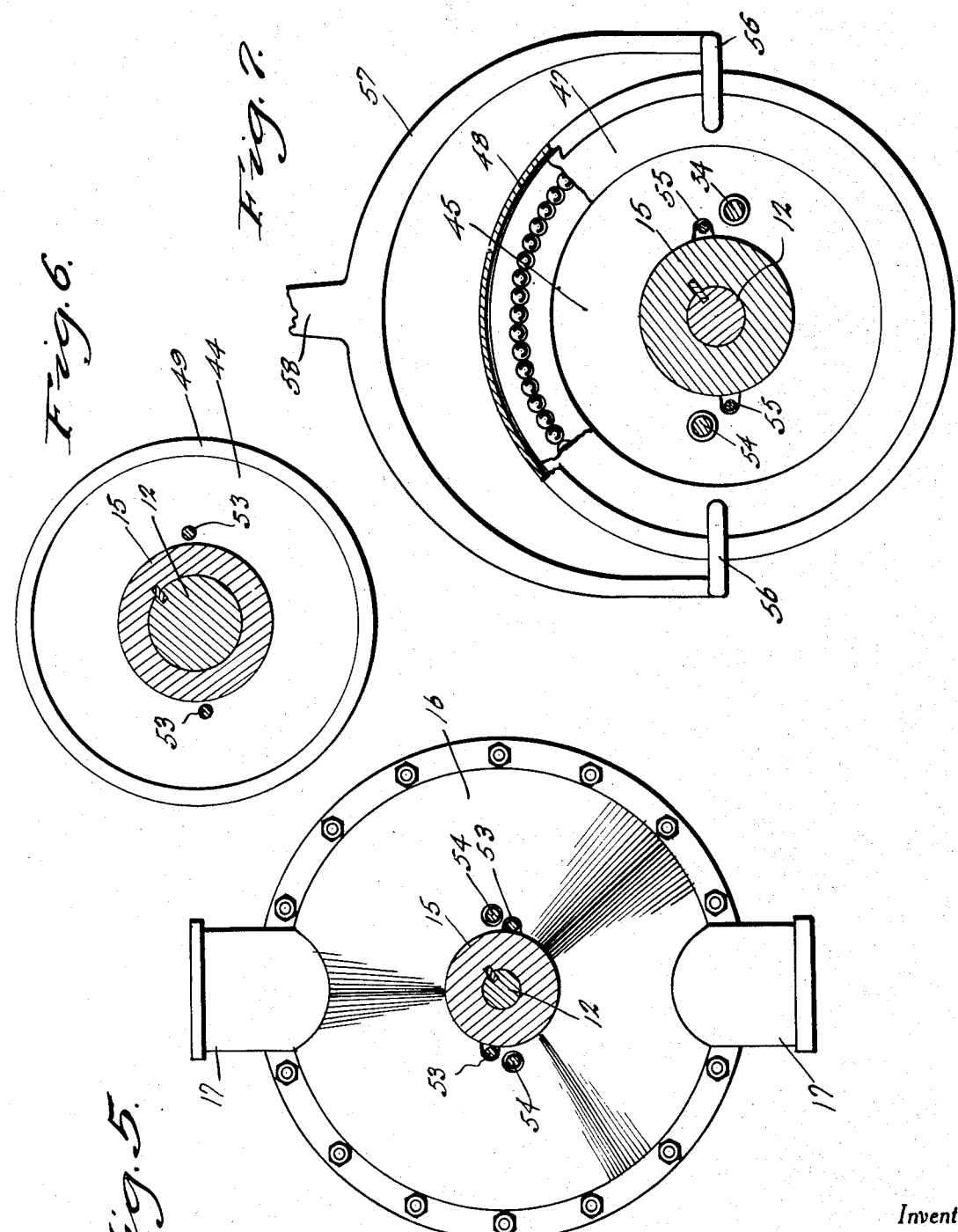
Inventor
J. W. Bace
By Clarence A. O'Brien
Attorney July 25, 1933.  J. W. BACE  1,919,875
PROPELLER PITCH REGULATOR
Filed April 13, 1932  6 Sheets-Sheet 6
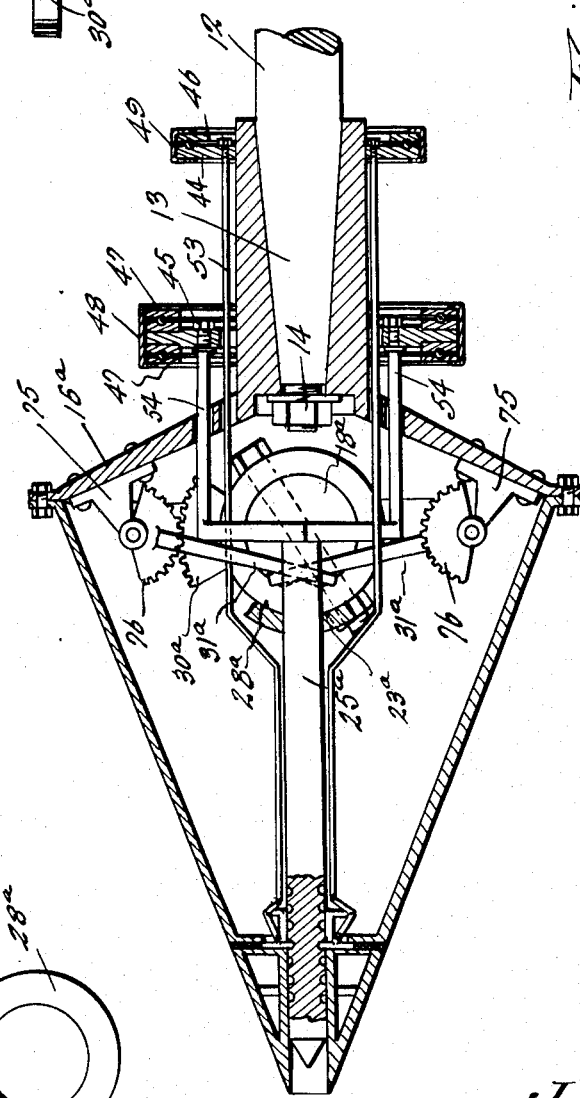
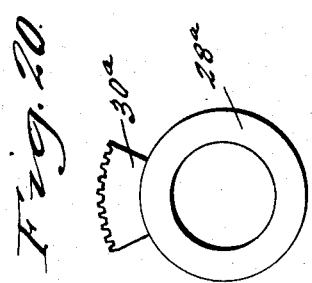
Inventor
J. W. Bace
By Clarence A. O'Brien
Attorney Patented July 25, 1933

1,919,875

UNITED STATES PATENT OFFICE

JESS W. BACE, OF TAFT, CALIFORNIA

PROPELLER PITCH REGULATOR

Application filed April 13, 1932. Serial No. 605,064.

This invention appertains to new and useful improvements in propellers and more particularly to propellers for aircraft.

The principal object of this invention is to provide an aircraft propeller and mechanism whereby the pitch of the propeller blade can be changed to any desired degree.

Another important object of the invention is to provide a propeller pitch regulator wherein there are no moving or wearing parts, during the normal operation of the propeller.

Another important object of the invention is to provide a propeller pitch regulating mechanism which can be conveniently and efficiently operated from the cockpit of the aircraft.

Still another important object of the invention is to provide propeller pitch changing mechanism wherein latch means is employed for effectively retaining the propeller blade at its adjusted position.

These and other important objects and advantages of the invention will become apparent to the reader of the following specification.

In the drawings:—

Figure 1 represents a side elevational view of an aeroplane equipped with the improved propeller.

Fig. 2 represents an enlarged fragmentary detailed sectional view of the propeller blade adjusting means.

Fig. 3 represents a vertical sectional view taken substantially on line 3—3 of Fig. 2.

Fig. 4 represents a sectional view taken substantially on line 4—4 of Fig. 1.

Fig. 5 represents a sectional view taken substantially on line 5—5 of Fig. 2.

Fig. 6 represents a sectional view taken substantially on line 6—6 of Fig. 2.

Fig. 7 represents a sectional view taken on substantially line 7—7 of Fig. 2.

Fig. 8 represents an enlarged fragmentary sectional view through the nose part of the propeller.

Fig. 9 represents a fragmentary detailed sectional view taken substantially on line 9—9 of Fig. 8.

Fig. 10 represents a perspective view of one of the bell cranks.

Fig. 11 represents a fragmentary side elevational view of the shaft yoke.

Fig. 12 represents a fragmentary detailed sectional view of the modification shown in Fig. 19.

Fig. 13 represents a sectional view taken substantially on line 13—13 of Fig. 11.

Fig. 14 represents a perspective view of one of the latch bolts.

Fig. 15 represents a side elevational view of one of the propeller blade collars.

Fig. 16 represents an end elevational view of one of the collars.

Fig. 17 represents a sectional view taken substantially on line 17—17 of Fig. 2.

Fig. 18 represents a side elevational view of one of the connector bars shown in Fig. 4.

Fig. 19 represents a longitudinal sectional view through a slightly modified form of the invention.

Fig. 20 represents an end elevational view of one of the gear collars.

Fig. 21 represents an edge elevational view of one of the gear collars.

Fig. 22 represents a side elevational view of one of the segmental gears.

Fig. 23 represents an end elevational view of one of the segmental gears.

Referring to the drawings wherein like numerals designate like parts, it can be seen in Fig. 1 that numeral 5 represents the fuselage of an aircraft with numeral 6 the cockpit with the usual pilot seat 7 therein. Numeral 8 represents the wings of the aircraft while numeral 9 represents generally the engine situated within the shield 11 and from which extends the drive shaft 12.

As is clearly shown in Fig. 2, the forward end of the drive shaft 12 is tapered as at 13 and provided with a threaded extension and a nut 14 whereby the barrel 15 with its tapered bore can be firmly retained thereon. The forward end of this barrel 15 is equipped with a conical shaped cap 16 which has a pair of cylindrical bearing sleeves 17—17 extending radially therefrom in opposite directions, these sleeves being adapted to receive the shank ends 18 of the propeller blades 19 as in the manner substantially shown in the drawings.

The nose portion of the propeller mechanism consists of an elongated conical-shaped shell 20, the apex or forward end of which is provided with a forwardly extending barrel 21 supported at its inner end by the spider 22. A bearing 23 is supported in the shell 20 by the spider 24, and this bearing 23 slidably supports the slidable bar 25, which is provided with an end portion 26 slidable through the barrel 21. The end portion 26 is provided with a plurality of closely spaced recesses 27, there being a row of these recesses 27 on diametrically opposite side portions of the end portion 26.

The inner ends of the propeller blades 18 have collars 28 secured thereto by pins 29 and each collar 28 is equipped with a tangentially disposed lever 30. As is clearly shown in Fig. 4, these levers are normally diverged forwardly and each has the rear end of a connecting bar 31 pivotally connected thereto as at 32. This pivotal connection 32 warrants a yoke 33 (see Fig. 18) on one end of each bar 31, while the opposite or forward end of each bar 31 is provided with a pair of leg extensions 34—34 for straddling the bar 25 at the reduced portion 35, and a common pin or bolt 36 serves to pivotally secure all of the legs 34 to the bar 25 at this point 35.

As is clearly shown in Fig. 8, the internally threaded tubes 37—37 extend inwardly from the shell 20 to meet the barrel 21 and as is clearly shown in Fig. 8, the inner end of the barrel 21 is provided with two pairs of ears 38—38 each of which supports a bell crank 39.

As is clearly shown in Fig. 4, a bolt 40 is slidable in each of the tubes 37 and is engageable directly into the openings 27 of the bar 25. As is clearly shown in Fig. 14, each of these bolts 40 is provided with ears 41 to which the forward end of the corresponding bell crank 39 is pivotally secured. In each of the tubes 37 is an adjustable threaded plug 42 and interposed between each plug 42 and the corresponding bolt 40 is a compressible coiled spring 43.

The outer surface of the barrel 15 shown in Fig. 2 is perfectly cylindrical and has the disks 44 and 45 slidable thereon. The disk 44 has a supplemental ring 46 between which and the disk 44 ball bearings are mounted, while the disk 45 is provided with a ring 47 on each side thereof between which and the disk ball bearings are mounted. The disks and rings 45 and 47 are connected by the band 48 so that they can revolve independently while the disk 44 and ring 46 are connected by the band 49 whereby they can revolve independently.

Numeral 50 represents a rocker fulcrumed as at 51, the same being provided with a head 52 at its lower end which can press against the ring 46 as in the manner substantially shown in Figs. 2 and 4.

Extending from the disk 44 are the rods 53 which extend through openings in the disk 45 and connect at their forward ends to the remaining ends of the bell cranks 39. (See Fig. 4.) Extending from the disk 45 are the rods 54 which connect to the ends of the cross member 55 on the rear end of the aforementioned bar 25.

Numeral 56 represents a U-shaped member at the lower end of each leg of the yoke 57 which has an upstanding arm 58 rockably supported as at 59 on the bracket 60 supported by the fuselage 5 of the aircraft. A spring 61 is interposed between the upper end of the arm 50 and the bracket 60 for normally maintaining the head 52 urged against the ring 46.

A cable 62 extends from the upper end of the arm 50 and is trained under the pulley 63 on the lower end of the lever 64 which is located in the cockpit of the aircraft. Extending from the upper end of the arm 58 is the connecting rod 65 which extends to the intermediate portion of the aforementioned lever 64. Numeral 66 represents a rack and numeral 67 represents a detent, the latter being located on the lever 64.

It can now be seen, that by pulling the lever 64 rearwardly, a pull will be exerted on both the connecting rod 65 and the cable 62. This will result in the forward shifting of the disks 44 and 45 on the barrel 15, with the result that the rods 53 and 54 will move forwardly in the shell 20. The forward motion of the rod 54 will transmit rectilinear motion to the arm 25 which in turn will exert a pull on the connecting bars 31—31.

These bars pulling in unison will contract the levers 30 of the collars 28, to the end that the pitch of the propeller blades 19 will be changed.

At the moment the arm 25 begins to move, the rods 53 have already operated the bell crank 39 with the result that the latch bolts 40 have been retracted from engagement in the recesses 27 of the portion 26 of the bar 25.

Obviously, when the detent 67 is released, (see Fig. 1) the cable 62 is also released and pressure against the disk 44 ceases. Thus, the spring 43 in the tube 37 acting against the latch bolts 40 will force the latch bolts against the bar 25 and into corresponding recesses 27.

Fig. 19 discloses a slightly modified form of the invention. In this form, the propeller blades 18a are each provided with a collar 28a equipped with a segmental gear 30a, these segmental gears being disposed in opposite directions with respect to the combined longitudinal axis of the blades. On the inside of the cap 16a are the brackets 75—75 for supporting the segmental gears 76, each of which is provided with a lever 31a projecting toward the slide bar 25a and through the diametrically disposed opening 77 therein. In this opening 77 is a rearwardly extending protuberance 78 of rearwardly tapering construction, while in the bore 79 of the cross member 55a is a spring projection member 80 extending forwardly and provided with a tapered outer end opposed to the tapered protuberance 78. The free end portions of the levers 31a are urged against the apex edge portion of the protuberance 78 by the spring projected tapered member 80 as in the manner substantially shown in dotted lines in Fig. 12.

Obviously the form disclosed in Fig. 19 operates in substantially the same manner as the form shown in Fig. 2, motion being imparted to the bar 25 by the rod 54 in the same manner and motion being imparted to the gear 76 and through the gears 38 to the blade collars 28a by the connecting rods or levers 31a which are connected to bars 25a in the manner slidable and clearly shown in Fig. 12, obviously to afford a free motion yet without undesired vibration.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A propeller comprising a pair of swivelled propeller blades, a collar on each of the blades, a slide member, a cockpit control, a connection between the control and the slide member, connections between the slide member and the collar, said connections between the slide member and the collar comprising a pair of bars each pivotally connected to one end to a corresponding collar, said slide member being provided with an opening therein through which the free ends of the connecting bars are slidable.

2. A propeller comprising a pair of swivelled propeller blades, a collar on each of the blades, a slide member, a cockpit control, a connection between the control and the slide member, connections between the slide member and the collar, the connections between the slide member and the collar comprising a pair of bars each pivotally connected to one end to a corresponding collar, said slide member being provided with an opening through which the free ends of the connecting bars are slidable, and tensioning means in the said opening for the said connecting bars.

3. A propeller comprising a pair of swivelled propeller blades, an arm projecting from each of the blades, a slide member, a cockpit control, a connection between the control and the slide member, a pivotal bar depending from each of the said arms, said slide member being provided with an opening therein through which the bars extend from opposite directions, the said slide member at each end of the said opening being provided with a tapered protuberance which the said bars can fulcrum.

4. A propeller comprising a pair of swivelled propeller blades, an arm projecting from each of the blades, a slide member, a cockpit control, a connection between the control and the slide member, a pivotal bar depending from each of the said arms, said slide member being provided with an opening therein through which the bars extend from opposite directions, the said slide member at each end of the said opening being provided with a tapered protuberance which the said bars can fulcrum, one of the said protuberances being in the form of a slidable spring pressed member having a tapered bar contact end.

JESS W. BACE.